(12) United States Patent
Masuda et al.

(10) Patent No.: US 9,457,673 B2
(45) Date of Patent: Oct. 4, 2016

(54) ELECTRIC VEHICLE WITH CHARGING PORT ILLUMINATION

(75) Inventors: Tomokazu Masuda, Kasugai (JP); Yusuke Tsutsui, Anpachi-gun (JP); Shogo Hirata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 79 days.

(21) Appl. No.: 14/006,815

(22) PCT Filed: Apr. 12, 2011

(86) PCT No.: PCT/JP2011/059058
§ 371 (c)(1),
(2), (4) Date: Sep. 23, 2013

(87) PCT Pub. No.: WO2012/140729
PCT Pub. Date: Oct. 18, 2012

(65) Prior Publication Data
US 2014/0042966 A1    Feb. 13, 2014

(51) Int. Cl.
*B60L 11/18* (2006.01)
*B60L 1/00* (2006.01)
*B60L 11/00* (2006.01)
(Continued)

(52) U.S. Cl.
CPC ............ *B60L 11/1812* (2013.01); *B60L 1/003* (2013.01); *B60L 11/005* (2013.01); *B60L 11/14* (2013.01); *B60L 11/1814* (2013.01); *B60L 11/1818* (2013.01); *B60L 11/1846* (2013.01); *B60L 11/1861* (2013.01); *B60L 11/1868* (2013.01); *B60L 11/1887* (2013.01); *B60L 2210/10* (2013.01); *B60L 2210/30* (2013.01); *B60L 2250/10* (2013.01); *B60L 2250/16* (2013.01); *B60L 2270/32* (2013.01); *B60L 2270/34* (2013.01); *B60Q 1/50* (2013.01); *Y02T 10/70* (2013.01); *Y02T 10/7022* (2013.01); *Y02T 10/7044* (2013.01); *Y02T 10/7066* (2013.01); *Y02T 10/7072* (2013.01); *Y02T 10/7077* (2013.01); *Y02T 10/7216* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y02T 90/34* (2013.01); *Y04S 30/14* (2013.01)

(58) Field of Classification Search
CPC ...................................................... Y02T 90/16
USPC ............................................................ 320/109
See application file for complete search history.

(56) References Cited

U.S. PATENT DOCUMENTS 6,480,103 B1 * 11/2002 McCarthy et al. ........ 340/425.5
2005/0099067 A1 * 5/2005 Matsubara ................... 307/10.1
(Continued)

FOREIGN PATENT DOCUMENTS

| CN | 101678801 A | 3/2010 |
|---|---|---|
| EP | 1544955 A2 | 6/2005 |

(Continued)

*Primary Examiner* — Drew A Dunn
*Assistant Examiner* — Jerry D Robbins
(74) *Attorney, Agent, or Firm* — Oliff PLC

(57) ABSTRACT

A vehicle includes a power storage device, a power receiving unit for receiving power for charging the power storage device from an external power supply, an illumination unit for emitting light to the power receiving unit in response to a transistor attaining an on-state, and stopping the emission of light and a microcomputer for controlling the transistor.

6 Claims, 15 Drawing Sheets

(51) Int. Cl.
  *B60L 11/14* (2006.01)
  *B60Q 1/50* (2006.01)

(56) References Cited

U.S. PATENT DOCUMENTS

| | | | |
|---|---|---|---|
| 2009/0021364 A1* | 1/2009 | Frey et al. | 340/468 |
| 2009/0079389 A1 | 3/2009 | Ohtomo | |
| 2009/0242291 A1* | 10/2009 | Sagawa et al. | 180/65.265 |
| 2010/0026238 A1* | 2/2010 | Suzuki et al. | 320/109 |
| 2010/0045450 A1* | 2/2010 | Suzuki et al. | 340/438 |
| 2010/0133024 A1* | 6/2010 | Miwa et al. | 180/65.21 |
| 2010/0273080 A1* | 10/2010 | Noguchi et al. | 429/442 |
| 2010/0320964 A1* | 12/2010 | Lathrop | B60K 6/445 320/109 |
| 2011/0043355 A1* | 2/2011 | Chander et al. | 340/455 |
| 2011/0207358 A1 | 8/2011 | Ichikawa et al. | |
| 2011/0298422 A1* | 12/2011 | Failing | 320/109 |
| 2013/0326955 A1* | 12/2013 | Kotama et al. | 49/13 |

FOREIGN PATENT DOCUMENTS

| | | |
|---|---|---|
| EP | 2174815 A1 | 4/2010 |
| JP | H06-325834 A | 11/1994 |
| JP | H07-87607 A | 3/1995 |
| JP | A-2008-210621 | 9/2008 |
| JP | 2008-279938 A | 11/2008 |
| JP | A 2009-77557 | 4/2009 |
| JP | A-2009-087870 | 4/2009 |
| JP | A 2010-123284 | 6/2010 |
| JP | A-2011-010420 | 1/2011 |
| JP | A-2011-087350 | 4/2011 |
| JP | A 2012-56327 | 3/2012 |

* cited by examiner

|     | OPERATION | ECU | LID SW | LID ILLUMINATION |
|-----|-----------|-----|--------|------------------|
| (1) | LID CLOSE | Tr1 ON | OFF | ILLUMINATION OFF |
| (2) | LID OPEN | Tr1 ON | ON | ILLUMINATION ON |
| (3) | PLUG INSERTED | Tr1 OFF | ON | ILLUMINATION OFF |
| (4) | PLUG DETACHED | Tr1 ON | ON | ILLUMINATION ON |
| (5) | LID CLOSE | Tr1 ON | OFF | ILLUMINATION OFF |

ELECTRIC VEHICLE WITH CHARGING PORT ILLUMINATION

TECHNICAL FIELD

The present invention relates to illumination for a power receiving unit on a vehicle side to which an external power supply connector is attached.

BACKGROUND ART

There has been known a technology for charging an on-board power storage device by using a power supply provided outside of a vehicle. Further, there has been known a technology for improving workability by using an illumination device when attaching a connector connected to a power supply to a vehicle. Such technologies are disclosed in Japanese Patent Laying-Open No. 2009-087870 (PTD 1), Japanese Patent Laying-Open No. 2011-010420 (PTD 2), and Japanese Patent Laying-Open No. 2008-210621 (PTD 3).

CITATION LIST

Patent Document

PTD 1: Japanese Patent Laying-Open No. 2009-087870
PTD 2: Japanese Patent Laying-Open No. 2011-010420
PTD 3: Japanese Patent Laying-Open No. 2008-210621

SUMMARY OF INVENTION

Technical Problem

When continuous illumination using an illumination device is performed at the time of charging with use of an external power supply, there is a possibility of causing an undesirable increase in electric power consumed by the illumination device.

An object of the present invention is to provide a vehicle and a method for controlling a vehicle capable of suppressing deterioration in workability while suppressing an increase in electric power consumption at the time of charging with use of an external power supply.

Solution to Problem

A vehicle in accordance with one aspect of the present invention includes a power storage device, a power receiving unit for receiving electric power for charging the power storage device from an external power supply, an illumination unit for emitting light to the power receiving unit in response to a first switch attaining a conduction state, and for stopping the emission of light in response to the first switch attaining a non-conduction state, a controller for controlling the first switch such that the first switch attains the non-conduction state in response to connection between the power supply and the power receiving unit and such that the first switch attains the conduction state in response to release of the connection between the power supply and the power receiving unit.

Preferably, the vehicle further includes a lid for shielding the power receiving unit from outside of the vehicle, and a second switch which attains the conduction state when the lid is opened, and attains the non-conduction state when the lid is closed.

Preferably, the first switch, the second switch, and the illumination unit are connected in series.

More preferably, the vehicle further includes a detector for detecting which of the conduction state and the non-conduction state the second switch is in, and a notifying unit for notifying a passenger of the vehicle about a state of the vehicle. The controller uses the notifying unit to notify the passenger about a state of the lid based on a detection result provided by the detector.

More preferably, the notifying unit is a display unit provided at an indicator. The controller causes the display unit to display that the lid is opened when the second switch is in the conduction state.

More preferably, when the second switch is in the conduction state, and the vehicle is in a movable state, the controller causes the display unit to display that the lid is opened.

More preferably, when the power supply and the power receiving unit are not connected before elapse of a predetermined time period after the second switch attains the conduction state, the controller controls the first switch such that said first switch attains the non-conduction state.

More preferably, the first switch is a transistor.

More preferably, the power receiving unit includes a first inlet for connection with a first power supply of alternate current power and a second inlet for connection with a second power supply of direct current power. The controller controls the first switch such that the first switch attains the non-conduction state when at least any one of the first power supply and the second power supply is connected with the power receiving unit, and the first switch attains the conduction state when neither the first power supply nor the second power supply is connected with the power receiving unit.

A method for controlling a vehicle according to another aspect of the present invention is used for a vehicle including a power storage device, a power receiving unit for receiving electric power for charging the power storage device from an external power supply, and an illumination unit for emitting light to the power receiving unit in response to a switch attaining a conduction state, and for stopping the emission of light in response to the switch attaining a non-conduction state. This method for controlling a vehicle includes the steps of controlling the switch such that the switch attains the non-conduction state in response to connection between the power supply and the power receiving unit, and controlling the switch such that the switch attains the conduction state in response to release of the connection between the power supply and the power receiving unit.

Advantageous Effects of Invention

According to the present invention, emission of light with respect to a power receiving unit is stopped after connection of the power supply and the power receiving unit and before release of the connection. Therefore, an increase in electric power consumed by the illumination unit can be suppressed. Further, before the connection between the power supply and the power receiving unit and after the release of the connection between the power supply and the power receiving unit, light is emitted to the power receiving unit. In other words, since the illumination is performed by the illumination unit during work, deterioration in working convenience can be suppressed. Thus, a vehicle and a method for controlling the vehicle capable of suppressing an increase in electric power consumption while suppressing deterioration in working convenience at the time of charging with use of an external power supply can be provided.

DESCRIPTION OF EMBODIMENTS

Figure 1:
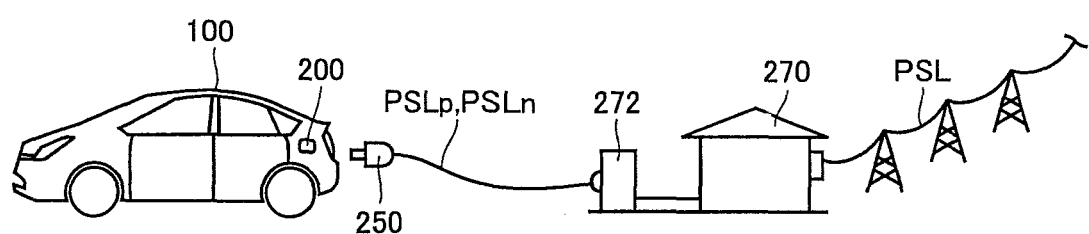
FIG. 1 represents a schematic configuration of a system for external charging.

Hereinafter, embodiments of the present invention will be described with reference to the drawings. In the description below, the same elements have the same reference characters allotted. They are named and function identically. Therefore, detailed description thereof will not be repeated.

FIG. 1 represents a system 1 for external charging with respect to a vehicle 100. System 1 includes a commercial power supply line PSL, a residential house 270, and a charging device 272 provided outside of vehicle 100.

Residential house 270 is supplied with commercial power through commercial power supply line PSL. Charging device 272 supplies electric power for charging a power storage device provided in vehicle 100. A power supply for charging device 272 may be any power supply regardless of a voltage value and a type of current, i.e. direct or alternate, thereof. For example, as the power supply for charging device 272, a commercial power supply for each household and a solar power generation panel provided on the roof of each house and the like are envisioned. In the present embodiment, the power supply for charging device 272 is, for example, a commercial power supply. In other words, charging device 272 draws a portion of the commercial power supply from residential house 270 and supplies the power to vehicle 100. A charging station may be used in place of residential house 270.

Charging device 272 includes power supply lines PSLp and PSLn of cabtire cables and a charging connector 250. Each of power supply line PSLp and PSLn has one end connected to charging device 272 and the other end connected to charging connector 250.

In the present embodiment, vehicle 100 is a hybrid automobile provided with a power storage device as a power supply for vehicle 100. A hybrid automobile has motive power sources including an internal combustion engine (engine) and an electric motor rotationally driven by electric power supplied from the provided power storage device. A hybrid automobile is an electrically driven vehicle which optimally distributes driving force generated by respective motive power sources to achieve a high fuel consumption efficiency.

In the present embodiment, a hybrid automobile will be described as an example of an electrically driven vehicle, but the electrically driven vehicle is not particularly limited to this. An electrically driven vehicle is a generic name of a vehicle provided with a power storage device and capable of generating driving force with use of electric power supplied from a power storage device and includes an electric automobile, a fuel-cell vehicle, and the like in addition to a hybrid automobile.

Further, in the present embodiment, vehicle 100 includes a power receiving unit for receiving electric power for charging the power storage device from charging device 272, and a charging inlet 200 having an openable and closable lid.

When a user uses charging device 272 to charge the power storage device of vehicle 100, the lid of charging inlet 200 is opened, and then charging connector 250 is connected to the power receiving unit. After charging connector 250 is connected to the power receiving unit by the user, a charging control for the power storage device provided on vehicle 100 is started.

For distinguishing from charging operation for the power storage device during traveling of vehicle 100, charging operation for the power storage device with use of charging device 272 will be referred to as "external charging" in the following description.

Figure 2:
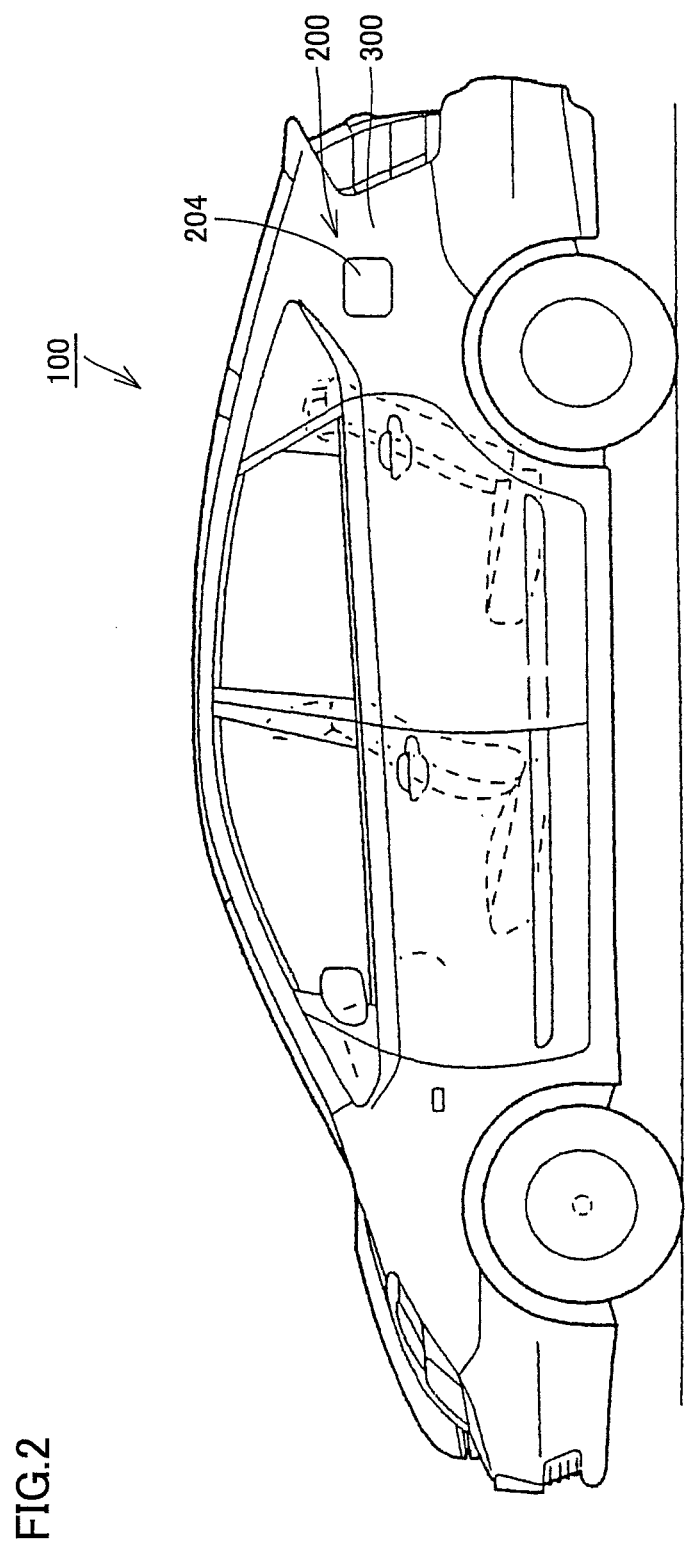
FIG. 2 is a side view of a vehicle.

FIG. 2 represents an example of a configuration with charging inlet 200 provided on a rear lateral face of vehicle body 300. The position at which charging inlet 200 is provided is not particularly limited to the position on a rear lateral face of the vehicle. For example, the position may be a front lateral face of vehicle body 300, a rear face of vehicle body 300, or a front face of vehicle body 300.

Charging inlet 200 is formed on an inner side of vehicle body 300 and includes an internal space for accommodating the power receiving unit. The internal space is formed to be open toward outside of vehicle body 300. Charging inlet 200 includes a lid 204 for shielding the power receiving unit from outside of vehicle 100. Lid 204 prevents entry of water and dust into the internal space of charging inlet 200.

Figure 3:
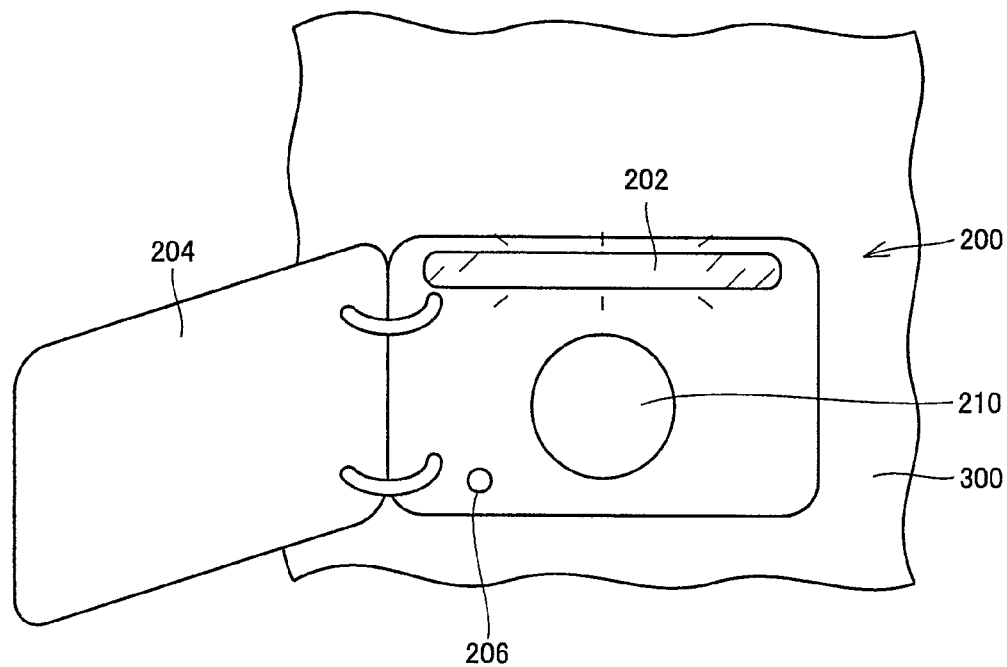
FIG. 3 is a (first) view representing an appearance of a charging inlet provided on the vehicle.

As shown in FIG. 3, in the internal space of charging inlet 200, a power receiving unit 210 is accommodated to which charging connector 250 is connected at the time of performing external charging. Further, lid 204 is provided rotatably.

Figure 4:
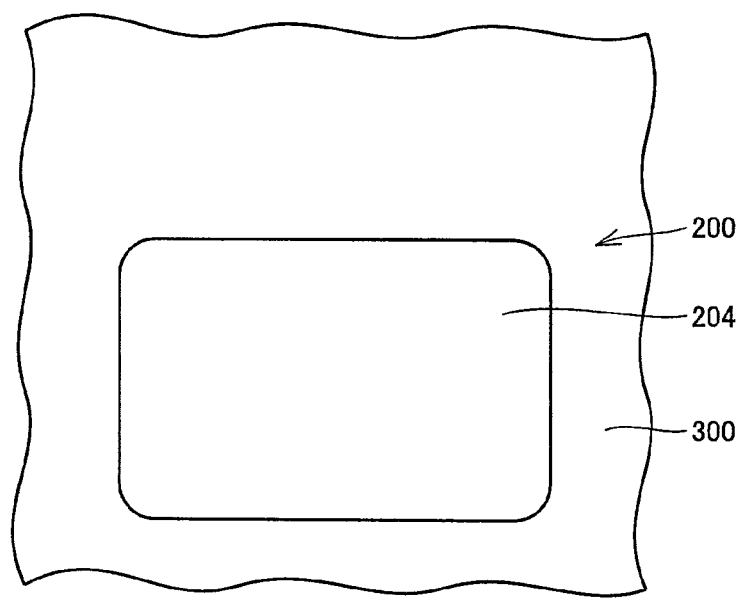
FIG. 4 is a (second) view representing an appearance of the charging inlet provided on the vehicle.

Therefore, pivot movement of lid 204 causes lid 204 to open, so that power receiving unit 210 is opened toward an external space. Further, as shown in FIG. 4, closing lid 204 causes power receiving unit 210 to be shielded from outside of vehicle 100.

Further, an illumination unit 202 for emitting light to power receiving unit 210 is provided in the internal space of charging inlet 200. Illumination 202 may be provided at a position suitable for emitting light to power receiving unit 210 such that the position of power receiving unit 210 can be visually confirmed when lid 204 is opened under a circumstance where illuminance around vehicle 100 is low, such as during the night time. The position of illumination unit 202 is not particularly limited to the position shown in FIG. 3.

Figure 5:
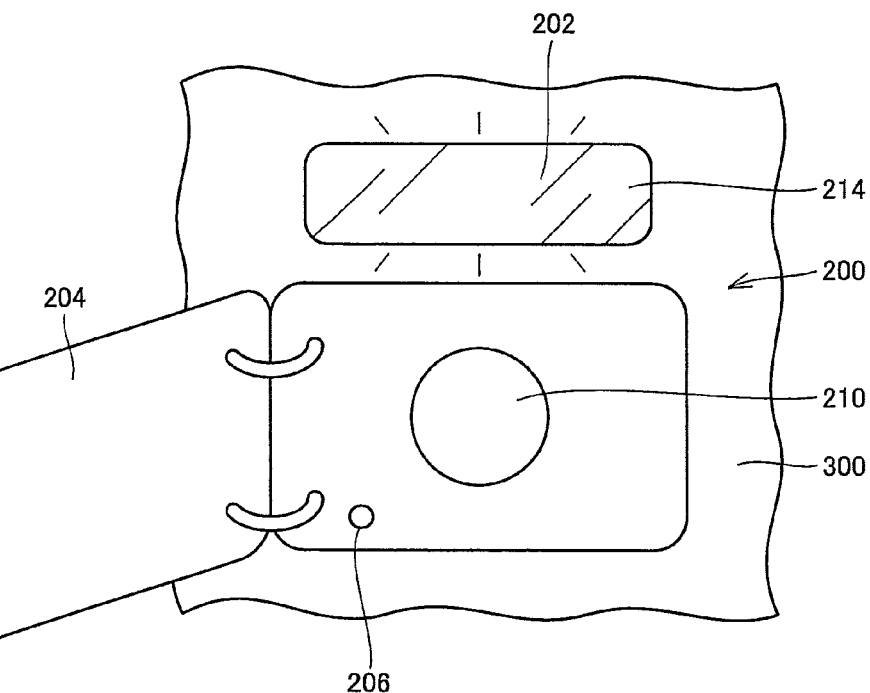
FIG. 5 is an external view of a charging inlet provided on the vehicle in accordance with another embodiment.

For example, as shown in FIG. 5, illumination unit 202 may be provided in proximity to an upper portion of charging inlet 200, or may be arranged on power receiving unit 210 itself, or may be provided inside of lid 204.

A lid switch 206 is provided in the internal space of charging inlet 200. Lid switch 206 attains a conduction state when lid 204 is opened, and into a non-conduction state when lid 204 is closed. Lid 204 is provided with a mechanical structure for switching from one of the conduction state and the non-conduction state of lid switch 206 to the other state in response to opening and closing lid 204.

Figure 6:
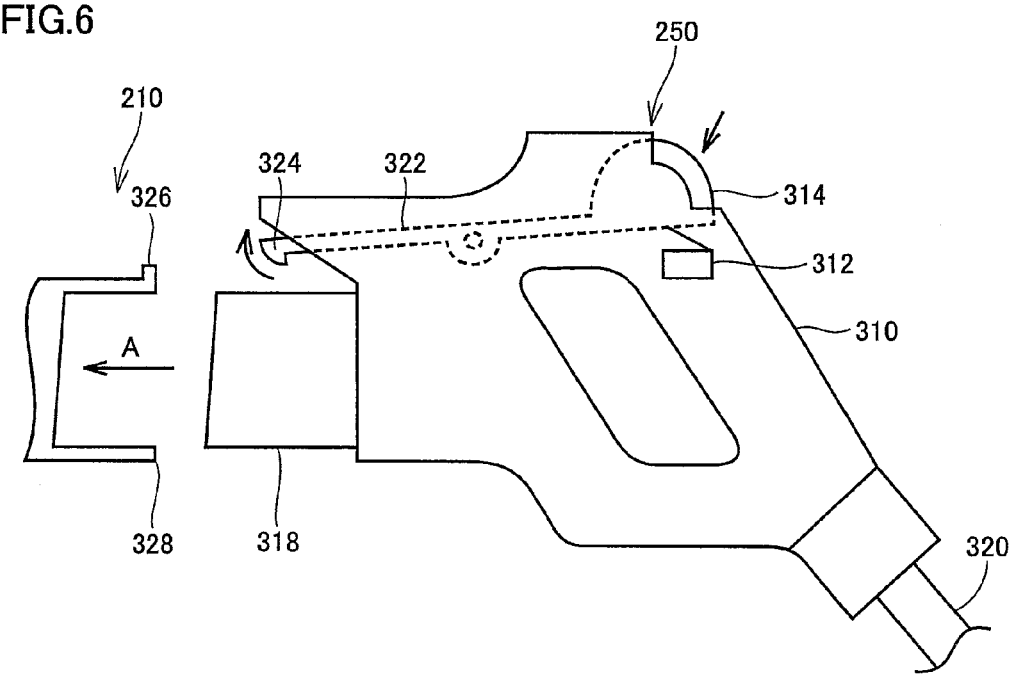
FIG. 6 represents a configuration of a charging connector.

FIG. 6 illustrates configurations of charging connector 250 and power receiving unit 210. Charging connector 250 includes a connector main body 310, a locking part 322 having a lock release button 314, a switch 312, a charging cable 320, and a convex-shaped protrusion 318. Power receiving unit 210 is provided with a slot 328 having an internal concave-shaped structure.

A user holds connector main body 310 and inserts protrusion 318 into concave-shaped slot 328 of power receiving unit 210 in the direction indicated by the arrow A, so that charging connector 250 is connected to power receiving unit 210.

Switch 312 is a switch which is opened and closed in conjunction with locking part 322 for locking charging connector 250 with respect to power receiving unit 210. When switch 312 is turned on in a state where charging connector 250 is connected to power receiving unit 210, an ECU (Electronic Control Unit) which will described later detects that switch 312 is turned on.

Locking part 322 is a rod-like member having one end provided with lock release button 314 and the other end provided with a hook 324, and a pivotable fulcrum is provided between the one end and the other end. Locking part 322 moves when a user pushes lock release button 314 and when hook 324 moves over protrusion 326 provided in periphery of slot 328 of power receiving unit 210.

For example, when a user holds connector main body 310 and inserts protrusion 318 into slot 328 in the direction indicated by the arrow A, hook 324 of locking part 322 comes in contact with protrusion 326.

When a user inserts connector main body 310 further inside from the position at which hook 324 comes in contact with protrusion 326, hook 324 moves over protrusion 326. Accordingly, since hook 324 hooks into protrusion 326, movement of charging connector 250 in a drawing direction is restricted. Therefore, locking part 322 maintains attachment of charging connector 250 to power receiving unit 210.

Further, movement of hook 324 over protrusion 326 causes locking part 322 to pivot clockwise about the fulcrum. Therefore, switch 312 is turned on. ECU can detect connection of charging connector 250 to power receiving unit 210 in accordance with shifting of switch 312 from an off-state to an on-state.

Pushing lock release button 314 releases connection of hook 324 with respect to protrusion 326. Therefore, a user can release the restriction on the movement of charging connector 250 in the drawing direction by pushing lock release button 314.

Switch 312 may be turned on by inserting charging connector 250 into power receiving unit 210, and may be turned off by hooking hook 324 of locking part 322 into protrusion 326. In this case, ECU may detect connection of connector 250 to power receiving unit 210 by detecting initial off-on-off operation of switch 312, and may detect detachment of charging connector 250 from power receiving unit 210 by detecting next off-on-off operation of switch 312.

Alternatively, switch 312 may maintain the on-state while locking part 322 is maintained to be rotated clockwise about fulcrum during connection of charging connector 250 to power receiving unit 210, and may maintain the on-state until lock release button 314 is pushed next time when it is turned on by insertion of charging connector 250 into power receiving unit 210. In this case, ECU may detect connection of charging connector 250 to power receiving unit 210 by detecting off-on operation of switch 312 and detects detachment of charging connector 250 from power receiving unit 210 by detecting on-off operation of switch 312.

Figure 7:
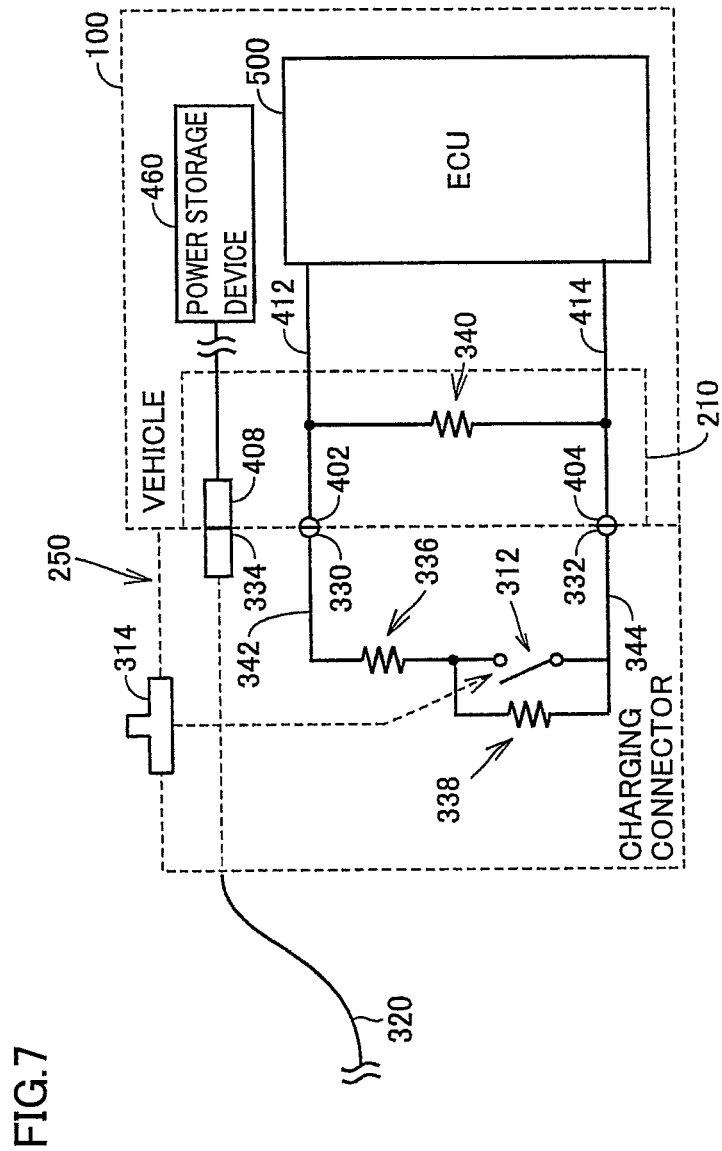
FIG. 7 represents a configuration for detecting a connection state of the charging connector in accordance with the present embodiment.

FIG. 7 shows an example of a configuration for obtaining connector connection information. As shown in FIG. 7, charging connector 250 further includes switch 312, a first signal terminal 330, a second signal terminal 332, a first charging terminal 334, a first resistor 336, a second resistor 338, a first signal line 342, and a second signal line 344.

First charging terminal 334 is connected to one end of charging cable 320. First signal terminal 330 is provided on one end of first signal line 342. Second signal terminal 332 is provided on one end of second signal line 344.

The other end of first signal line 342 is connected with one end of first resistor 336. The other end of first resistor 336 is connected to one end of switch 312 and one end of second resistor 338. The other end of switch 312 and the other end of second resistor 338 are connected respectively to second signal line 344. Thus, switch 312 and second resistor 338 are connected in parallel. Further, a resistance value of third resistor 340 is greater than a sum of a resistance value of first resistor 336 and a resistance value of second resistor 338.

Vehicle 100 includes power receiving unit 210, a power storage device 460, and an ECU 500. Power receiving unit 210 includes a third resistor 340, a second charging terminal 408, a third signal terminal 402, a fourth signal terminal 404, a third signal line 412, and a fourth signal line 414.

Third signal terminal 402 is provided on one end of third signal line 412. When charging connector 250 is connected to power receiving unit 210, first signal terminal 330 and third signal terminal 402 come in contact with each other to be connected electrically.

Fourth signal terminal 404 is provided on one end of fourth signal line 414. When charging connector 250 is connected to power receiving unit 210, second signal terminal and fourth signal terminal 404 come in contact with each other to be connected electrically.

ECU 500 is connected to the other end of third signal line 412 and the other end of fourth signal line 414. Further, third signal line 412 and fourth signal line 414 are connected by third resistor 340.

Power storage device 460 may be a secondary battery such as a nickel-metal hydride battery or a lithium ion battery, or may be a capacitor. Power storage device 460 is connected to second charging terminal 408 with intervention of equipment required for charging (for example, a converter or an inverter).

When charging connector 250 is connected to power receiving unit 210, first charging terminal 334 and second charging terminal 408 come in contact with each other to be connected electrically. Consequently, electric power for charging power storage device 460 can be supplied from charging device 272 to vehicle 100 through charging cable 320.

ECU 500 uses electric power of an auxiliary machine battery and the like to apply voltage to third signal line 412 to detect a connection state of charging connector 250 based on a state of current flowing to third signal line 412. Further, the connection state of charging connector 250 includes a first state in which charging connector 250 is not connected to power receiving unit 210, a second state in which charging connector 250 is connected to power receiving unit 210 and switch 312 is turned off, and a third state in which charging connector 250 is connected to power receiving unit 210 and switch 312 is turned on.

For example, when charging connector 250 is not connected to power receiving unit 210 (the first state), current flows through a path of third signal line 412, third resistor 340, and fourth signal line 414.

Further, when charging connector 250 is connected to power receiving unit 210 and switch 312 is turned off (the second state), current flows through a path of third signal line 412, first signal line 342, first resistor 336, second resistor 338, second signal line 344, and fourth signal line 414.

Furthermore, when charging connector 250 is connected to power receiving unit 210 and switch 312 is turned on (the third state), a current flows through a path of third signal line 412, first signal line 342, first resistor 336, switch 312, second signal line 344, and fourth signal line 414.

Therefore, ECU 500 detects which of the connection states among the first state, the second state, and the third state charging connector 250 is in based on which of the connection states of charging connector 250 the voltage between third signal line 412 and fourth signal line 414 corresponds to. ECU 500 may also detect which of the connection states among the first state, second state, and third state charging connector 250 is in based on which of the connection states of charging connector 250 a state of current flowing through third signal line 412 corresponds to.

For example, ECU 500 uses electric power supplied from charging device 272 to charge power storage device 460 when a detection is made that a connection state of charging connector 250 is the third state.

Figure 8:
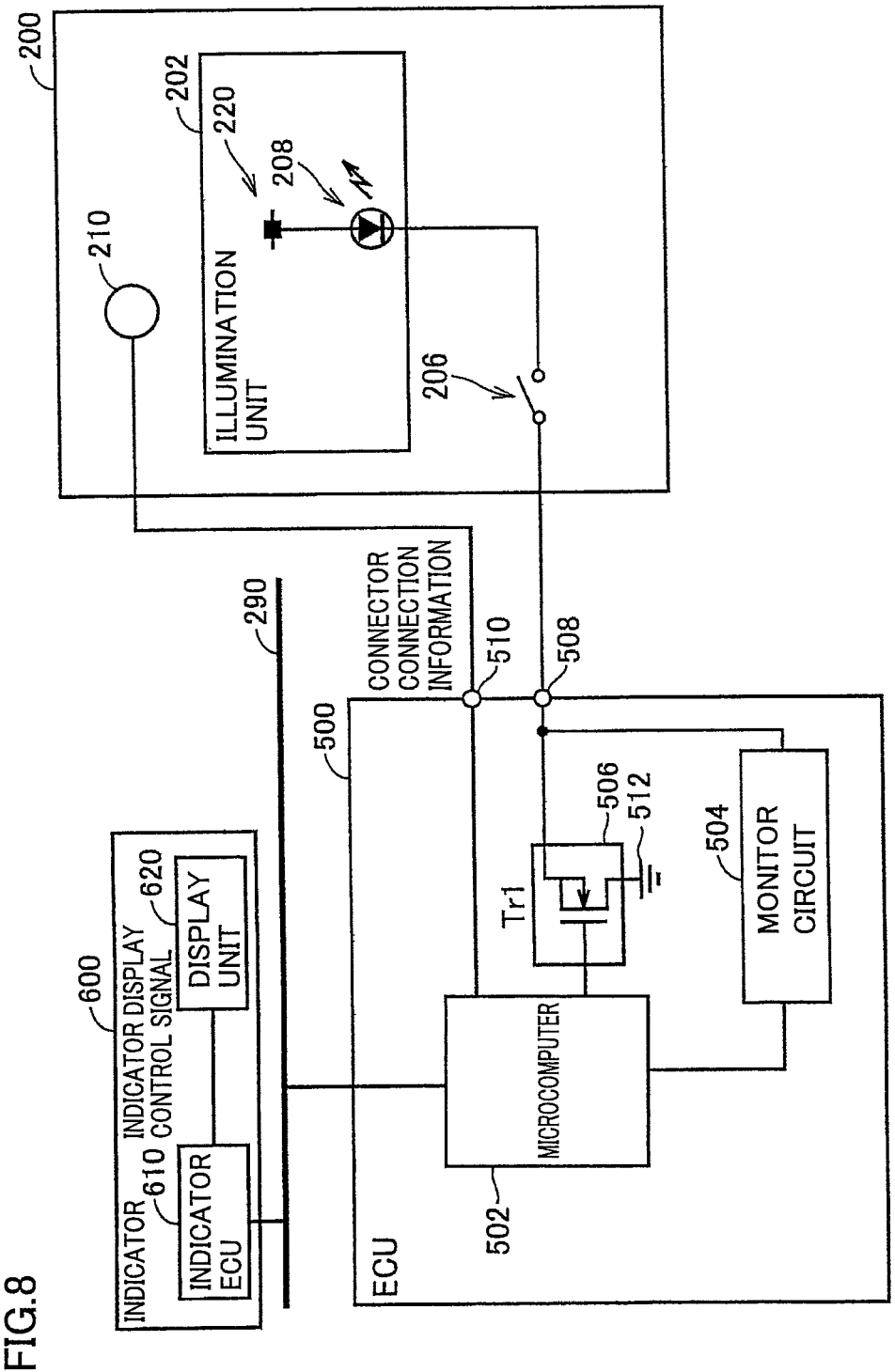
FIG. 8 represents configurations of an ECU and the charging inlet in accordance with the present embodiment.

As shown in FIG. 8, ECU 500 is connected so as to be communicable with indicator ECU 610 of indicator 600 through communication bus 290.

Indicator 600 is provided with a display unit 620 in addition to indicator ECU 610. Display unit 620 notifies information about a state of vehicle 100 to a passenger of vehicle 100. Indicator 600 may include, in place of display unit 620, a sound-generating device using sound or voice to notify information about a state of vehicle 100 to the passenger.

ECU 500 includes a microcomputer 502, a monitor circuit 504, a transistor 506, a first ECU terminal 508, and a second ECU terminal 510.

Microcomputer 502 receives a signal indicating a detection result of the connection state of charging connector 250 as connector connection information from power receiving unit 210 through second ECU terminal 510. Specifically, the connector connection information represents the voltage between third signal line 412 and fourth signal line 414 or current flowing through third signal line 412, as described above.

Further, microcomputer 502 generates and transmits a drive signal to transistor 506. For example, microcomputer 502 executes PWM control of a predetermined frequency with respect to transistor 506.

A base of transistor 506 is connected to microcomputer 502. An emitter of transistor 506 is connected to first ECU terminal 508. A collector of transistor 506 is connected to ground node 512.

Transistor 506 switches the conduction state and the non-conduction state between first ECU terminal 508 and ground node 512 from any one of the states to the other state based on a drive signal transmitted from microcomputer 502. In other words, first ECU terminal 508 and ground node 512 attain the conduction state when transistor 506 is turned on based on a drive signal transmitted from microcomputer 502. Further, first ECU terminal 508 and ground node 512 attain the non-conduction state when transistor 506 is turned off based on a drive signal transmitted from microcomputer 502. Ground node 512 is connected to a vehicle earth. In place of transistor 506, a switch such as a switching device or a relay other than transistor 506 may be used.

First ECU terminal 508 is connected to illumination unit 202 provided on charging inlet 200 with intervention of lid switch 206.

Monitor circuit 504 detects opened and closed states of lid 204. Specifically, monitor circuit 504 detects a state of lid switch 206 to detect opened and closed states of lid 204. For example, monitor circuit 504 detects that lid switch 206 is in the on-state when current flows between the emitter of transistor 506 and first ECU terminal 508. Monitor circuit 504 detects that lid switch 206 is in the off-state when current does not flow. Monitor circuit 504 transmits a signal indicating a detection result about opened and closed states of lid 204 to microcomputer 502.

Illumination unit 202 includes light emitting unit 208, and power supply node 220 for connection with a power supply for supplying power to light emitting unit 208. In the present embodiment, an LED (Light Emitting Diode) will be described as an example of light emitting unit 208. However, light emitting unit 208 is not particularly limited to an LED as long as power receiving unit 210 emits light. For example, light emitting unit 208 may be a filament lamp.

In the present embodiment, the power supply for supplying electric power to light emitting unit 208 is an auxiliary machine battery (not illustrated) provided in vehicle 100. Thus, power supply node 220 is connected to the auxiliary machine battery. The power supply for supplying electric power to light emitting unit 208 may be power storage device 460 or may be a DC/DC converter (not illustrated).

When lid switch 206 is in the on-state, and transistor 506 is in the on-state, power supply node 220 and ground node 512 attain the conduction state. Therefore, since current flows into light emitting unit 208, light emitting unit 208 emits light.

When lid switch 206 is in the off-state, or transistor 506 is in the off-state, power supply node 220 and ground node 512 attain the non-conduction state. Therefore, since current does not flow into light emitting unit 208, light emitting unit 208 stops emission of light.

As shown in FIG. 8, transistor 506, lid switch 206, and illumination unit 202 are connected in series.

In the vehicle having the configuration described above, according to the present embodiment, microcomputer 502 controls transistor 506 such that transistor 506 attains the off-state in response to connection between charging connector 250 and power receiving unit 210, so that emission of light by illumination unit 202 to power receiving unit 210 is stopped (illumination unit 202 is turned off).

Further, microcomputer 502 controls transistor 506 such that transistor 506 attains the on-state in response to release of connection between charging connector 250 and power receiving unit 210, so that emission of light by illumination unit 202 is performed (illumination unit 202 is turned on).

Figure 9:
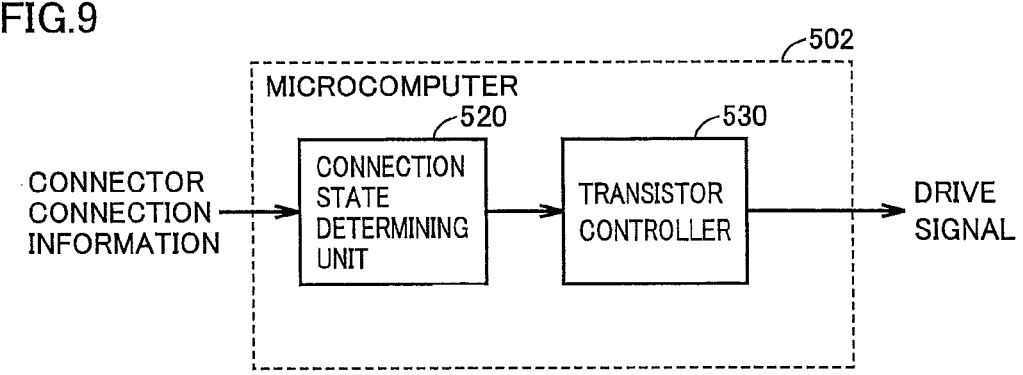
FIG. 9 is a functional block diagram for a microcomputer of the ECU in accordance with the present embodiment.

FIG. 9 is a functional block diagram for microcomputer 502 of ECU 500 in accordance with the present embodiment. Microcomputer 502 includes a connection state determining unit 520 and a transistor controller 530.

Connection state determining unit 520 determines whether or not charging connector 250 is connected to power receiving unit 210. Connection state determining unit 520 determines whether or not a connection state of charging connector 250 is in any of the first state, the second state, and the third state, as described with reference to FIG. 7. For example, connection state determining unit 520 determines that charging connector 250 is connected to power receiving unit 210 when a connection state of charging connector 250 is in any one of the second state and the third state. Connection state determining unit 520 determines that charging connector 250 is not connected to power receiving unit 210 when a connection state of charging connector 250 is in the first state. For example, connection state determining unit 520 may turn on a connection determination flag when it determined that charging connector 250 is connected to power receiving unit 210.

Transistor controller 530 controls transistor 506 such that transistor 506 attains the off-state when connection state determining unit 520 determines that charging connector 250 is connected to power receiving unit 210 (hereinafter, also referred to as an off-control with respect to transistor 506).

Specifically, transistor controller 530 generates a drive signal so as to allow transistor 506 to attains the off-state, and then transmits the generated drive signal to transistor 506.

Transistor controller 530 may generate a drive signal corresponding to a duty ratio of 0% when it is determined that charging connector 250 is connected to power receiving unit 210. Transistor controller 530 may reduce the duty ratio at a predetermined amount of change with elapse of time after it is determined that charging connector 250 is connected to power receiving unit 210.

Figure 10:
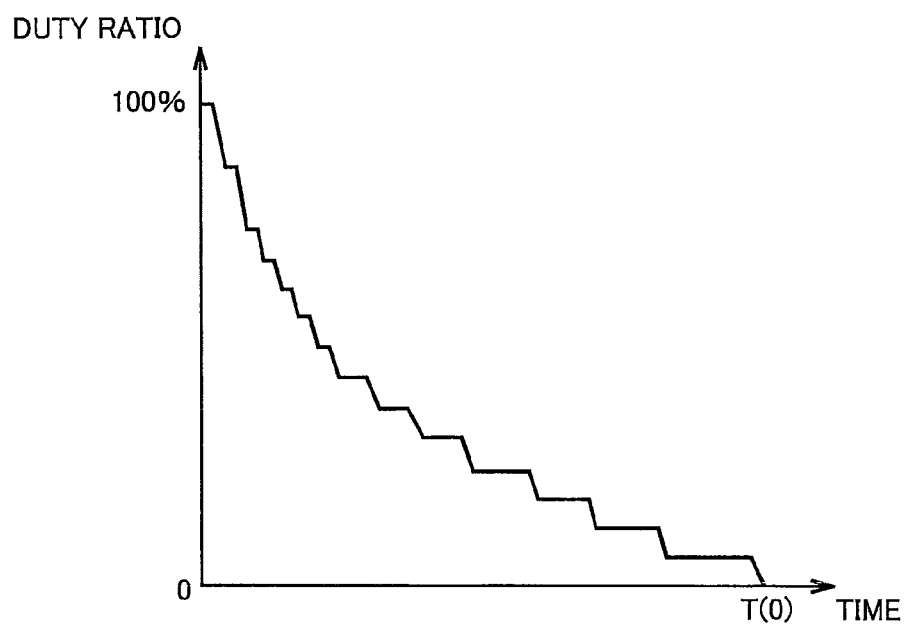
FIG. 10 is a timing chart representing an example of changes in a duty ratio when illumination is in an off-state.

Further, for example, transistor controller 530 may reduce the duty ratio with a predetermined reduction pattern as shown in FIG. 10. The predetermined reduction pattern shown in FIG. 10 is a pattern which is set such that the illuminance of light emitted by illumination unit 202 is gradually reduced. Further, the predetermined reduction pattern may be set so as to be the same as a reduction pattern of a duty ratio at the time of turning off other illumination unit (for example, an interior light and the like) provided in vehicle 100. Further, the predetermined reduction pattern may be set such that a duty ratio becomes 0% before elapse of a predetermined time period. Transistor controller 530 continues the off-state when connection state determining unit 520 determines that charging connector 250 is connected to power receiving unit 210, and transistor 506 is in the off-state.

For example, transistor controller 530 may execute the off-control with respect to transistor 506 when the connection determining flag is in the on-state.

Further, transistor controller 530 controls transistor 506 such that transistor 506 attains the on-state when connection state determining unit 520 determines that the connection of charging connector 250 with power receiving unit 210 is released (hereinafter, also referred to as on-control with respect to transistor 506).

Specifically, transistor controller 530 generates a drive signal to drive transistor 506 such that transistor 506 attains the on-state. Transistor controller 530 transmits the generated drive signal to transistor 506.

Transistor controller 530 may generate a drive signal corresponding to the duty ratio of 100% when it is determined that the connection of charging connector 250 to power receiving unit 210 is released. Transistor controller 530 may increase the duty ratio at a predetermined amount of change or a predetermined increase pattern with elapse of time after it is determined that the connection of charging connector 250 to power receiving unit 210 is released. Transistor controller 530 may start increasing the duty ratio after elapse of a predetermined time period since it is determined that the connection of charging connector 250 with respect to power receiving unit 210 is released.

The predetermined increase pattern may be a pattern which is set such that the illuminance of light emitted by illumination unit 202 increases gradually. The predetermined increase pattern may be set to be the same as the increase pattern of a duty ratio at the time when another illumination unit mounted on vehicle 100 is turned on. Further, the predetermined increase pattern may be set such that the duty ratio becomes 100% before elapse of a predetermined time period. Further, transistor controller 530 continuous the on-state when determining unit 520 determined that the connection of charging connector 250 with respect to power receiving unit 210 is released, and transistor 506 is in the on-state.

Transistor controller 530, for example, may execute the on-control with respect to transistor 506 when the connection determination flag is in the off-state.

In the present embodiment, connection state determining unit 520 and transistor controller 530 are described as being operated in software achieved by a executing a program stored in a memory by microcomputer 502, but it may be achieved by hardware. Such a program is recorded on a recording medium and provided in the vehicle.

Figures 11, 12:
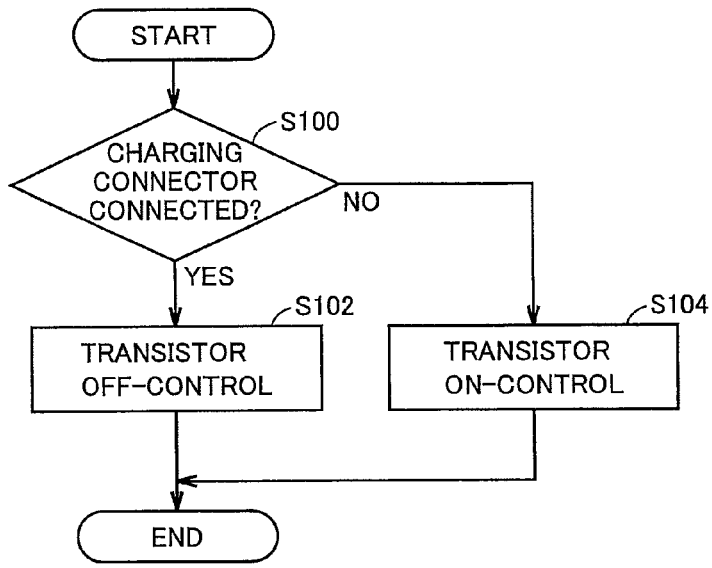
FIG. 11 is a flowchart representing a control structure of a program executed by the microcomputer of the ECU in accordance with the present embodiment.
FIG. 12 is a diagram for describing changes in illumination to the power receiving unit in response to operation by a user.

With reference to FIG. 11, a control structure of the program executed by microcomputer 502 of ECU 500 in accordance with the present embodiment will be described.

In step (hereinafter, step will be indicated as "S") 100, microcomputer 502 determines whether or not charging connector 250 is connected to power receiving unit 210. When it is determined that charging connector 250 is connected to power receiving unit 210 (YES in S100), the process proceeds to S102. If not so (NO in S100), the process proceeds to S104.

In S102, microcomputer 502 executes an off-control with respect to transistor 506. In S104, microcomputer 502 executes an on-control with respect to transistor 506. Since the on-control and the off-control with respect to transistor 506 are performed in a manner as described above, detailed description thereof will not be repeated.

Operation of microcomputer 502 in accordance with the present embodiment based on the structure and the flowchart described above will be described with reference to FIG. 12.

For example, a case is assumed where vehicle 100 is stopped, and lid 204 is closed, as shown in (1) of FIG. 12. In the state of (1) in FIG. 12, charging connector 250 is not connected to power receiving unit 210 (NO in S100), thus transistor 506 attains the on-state (S104). On the other hand, since lid 204 is closed, lid switch 206 attains the off-state. Therefore, even when transistor 506 is in the on-state, power supply node 220 and ground node 512 attain the non-conduction state. Thus, illumination unit 202 attains the off-state.

A case is assumed where a user opens lid 204 to bring the state shown in (2) of FIG. 12. In the state of (2) in FIG. 12, since charging connector 250 is not connected to power receiving unit 210 (NO in S100), transistor 506 attains the on-state (S104). On the other hand, since lid 204 is opened, lid switch 206 attains the on-state. Therefore, power supply node 220 and ground node 512 attain the conduction state. Thus, illumination unit 202 attains the on-state.

A case is assumed where the state of (3) in FIG. 12 is brought after a user opens lid 204 and then charging connector 250 is connected to power receiving unit 210. In the state of (3) in FIG. 12, since charging connector 250 is connected to power receiving unit 210 (YES in S100), the off-control with respect to transistor 506 is executed (S102). On the other hand, since lid 204 is opened, lid switch 206 attains the on-state. Since transistor 506 is in the off-state, power supply node 220 and ground node 512 attain the non-conduction state. Thus, illumination unit 202 attains the off-state.

A case is assumed where the state of (4) in FIG. 12 is brought when a user detaches charging connector 250 from power receiving unit 210 after charging is completed. In the state of (4) in FIG. 12, since charging connector 250 is not connected to power receiving unit 210 (NO in S100), the on-control with respect to transistor 506 is executed (S104). On the other hand, since lid 204 is opened, lid switch 206 attains the on-state. Therefore, power supply node 220 and ground node 512 attain the conduction state. Thus, illumination unit 202 attains the on-state.

A case is assumed where the state of (5) in FIG. 12 is brought when a user detaches charging connector 250 from power receiving unit 210 and thereafter closes lid 204. In the state of (5) in FIG. 12, since charging connector 250 is not connected to power receiving unit 210 (NO in S100), transistor 506 is attains the on-state (S104). On the other hand, since lid 204 is closed, lid switch 206 attains the off-state. Therefore, even when transistor 506 is in the on-state, power supply node 220 and ground node 512 attain the non-conduction state. Thus, illumination unit 202 attains the off-state.

Further, in the present embodiment, indicator ECU 610 notifies a passenger on vehicle 100 about the opened and closed states of lid. In the following, operation of indicator ECU 610 will be described with reference to FIG. 13 and FIG. 14. In the present embodiment, the following operation will be described as operation of indicator ECU 610, but the operation is not limited to this. For example, ECU 500 may perform the operation in place of indicator ECU 610.

Figure 13:
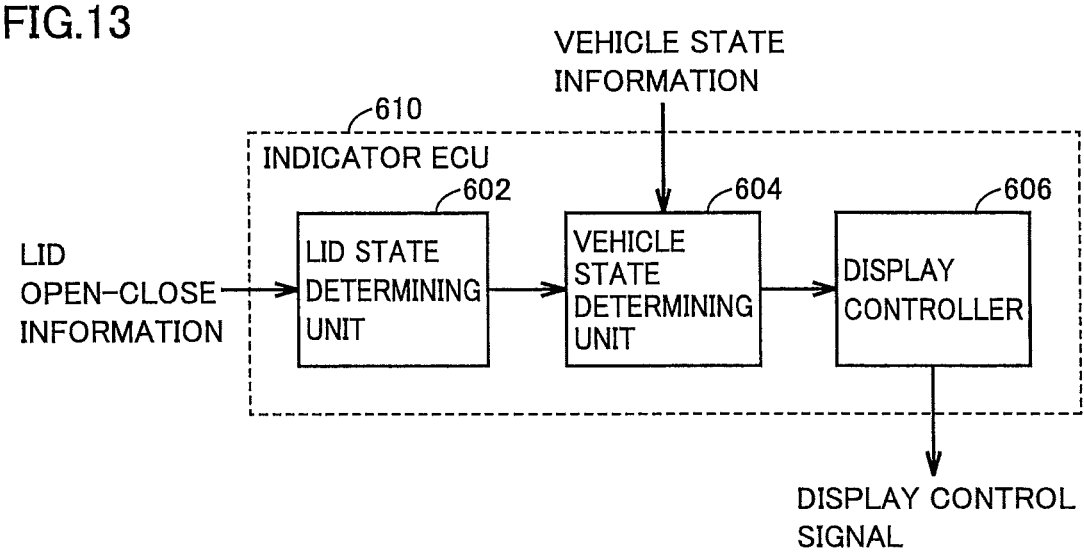
FIG. 13 is a functional block diagram for an indicator ECU in accordance with the present embodiment.

FIG. 13 shows a functional block diagram of indicator ECU 610 in the present embodiment. Indicator ECU 610 includes a lid state determining unit 602, a vehicle state determining unit 604, and a display controller 606.

Lid state determining unit 602 determines whether or not lid 204 is opened based on lid open-close information received from microcomputer 502 of ECU 500. Lid state determining unit 602 may turn on a lid determination flag when it determines that lid 204 is opened.

Vehicle state determining unit 604 determines whether or not vehicle 100 is in a movable state. Vehicle state determining unit 604 determines that vehicle 100 is in the movable state when vehicle 100 is in a state of being able to run. Vehicle state determining unit 604 determines that vehicle 100 is in the state of being able to travel when the state of vehicle 100 is in a state after the system of vehicle 100 is started, and in a state where a system check is completed.

Alternatively, vehicle state determining unit 604 determines that vehicle 100 is in the movable state when a shift position other than a parking position (hereinafter referred to as P position) is selected. For example, vehicle state determining unit 604 determines that a shift position other than the P position is selected when a travel position or a neutral position is selected.

Vehicle state determining unit 604, for example, may turn on the state determination flag when it is determined that vehicle 100 is in the movable state.

When lid 204 is opened, and vehicle 100 is in the movable state, display controller 606 uses display unit 620 to notify a passenger of vehicle 100 that lid 204 is open. In the present embodiment, display controller 606 controls display unit 620 to display a warning indicating that that lid 204 is open. Hereinafter, displaying a warning on display unit 620 will be referred to as "warning display on". For example, display controller 606 may turn on a warning lamp indicating that lid 204 is opened. Display controller 606 may use sound or voice in place of displaying on display unit 620 to notify a passenger of vehicle 100 that lid 204 is opened.

For example, display controller 606 may use display unit 620 to notify the passenger of vehicle 100 that lid 204 is opened when both the lid determination flag and the state determination flag are in the on-state.

In the present embodiment, lid state determining unit 602, vehicle state determining unit 604, and display controller 606 will be described as being operated in software achieved by a CPU of indicator ECU 610 executing a program stored in the memory, but it may be realized by hardware. Such a program is recorded on a recording medium and provided in vehicle 100.

Figure 14:
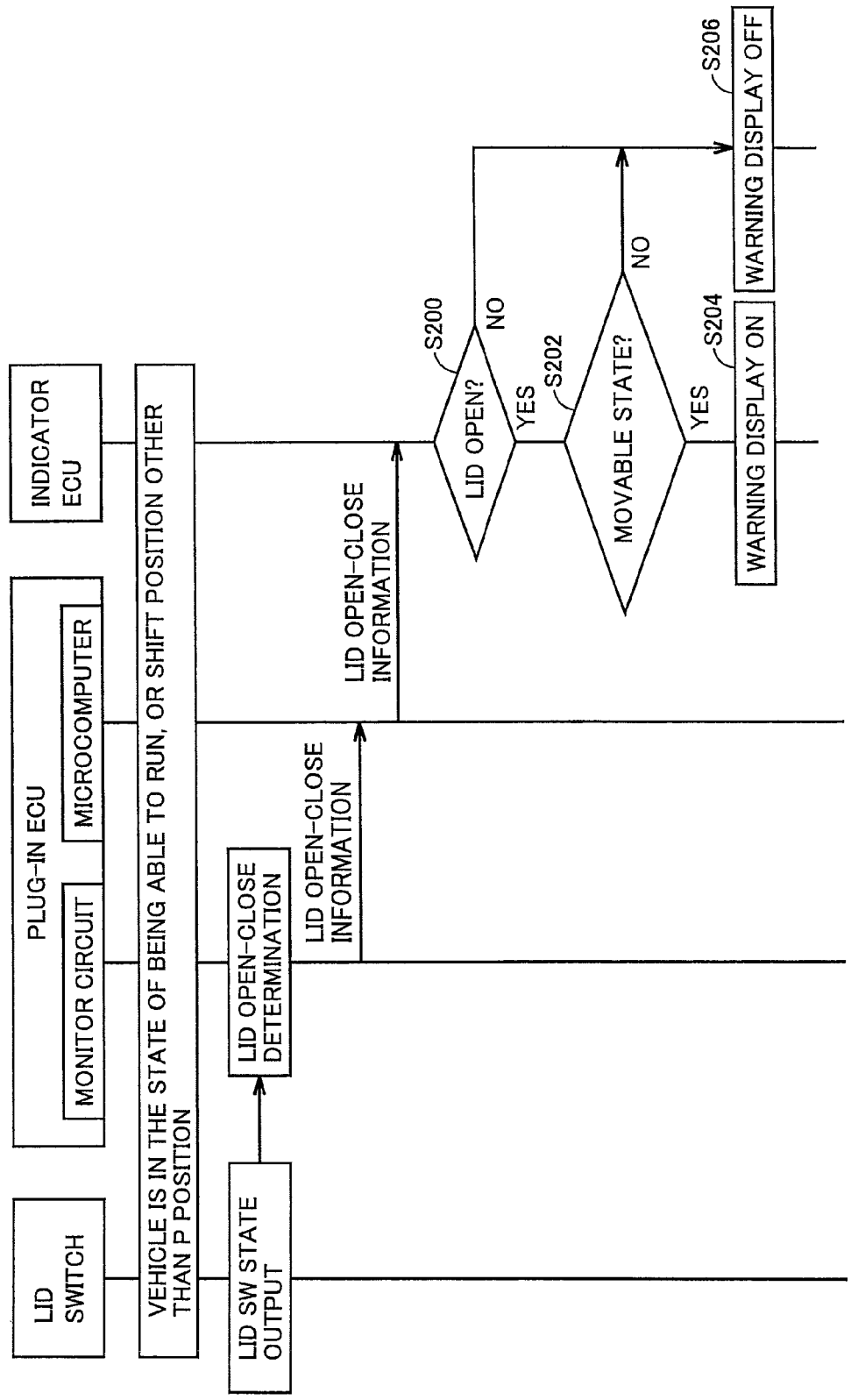
FIG. 14 is a diagram for describing an operating sequence of a lid switch, the ECU, and the indicator ECU.

With reference to FIG. 14, an operation sequence of ECU 500 and indictor ECU 610 in accordance with the present embodiment will be described.

Monitor circuit 504 detects whether lid 204 is in an opened state or a closed state based on an output in accordance with a state of lid switch 206. Monitor circuit 504 transmits lid open-close information indicating that the detected lid 204 is in the opened state or in the closed state to microcomputer 502. Microcomputer 502 transmits the received lid open-close information to indicator ECU 610.

Indicator ECU 610 determines whether lid 204 is in the opened state based on the received lid open-close information (S200). When lid 204 is in the opened state (YES in S200), indicator ECU 610 determines whether or not vehicle 100 is in the movable state (S202).

When vehicle 100 is in the movable state (YES in S202), indicator ECU 610 turns on the warning display (S204). When lid 204 is in the closed state (NO in S200), or when vehicle 100 is not in the movable state (NO in S202), indicator ECU 610 turns off the warning display (S206).

As described above, according to the vehicle of the present embodiment, when lid 204 is opened, and when the connection of charging connector 250 with respect to power receiving unit 210 is released, illumination unit 202 attains the on-state. Therefore, since illumination unit 202 emits light to power receiving unit 210 also in a case of working in the night time by a user, deterioration in working convenience can be suppressed. On the other hand, when charging connector 250 is connected to power receiving unit 210, illumination unit 202 is in the off-state until the connection between charging connector 250 and power receiving unit 210 is released. Therefore, the increase in electric power consumed by illumination unit 202 can be suppressed. Thus, a vehicle and a method for controlling vehicle suppressing deterioration of workability and suppressing increase in power at the time of charging with use of external power supply can be provided.

Further, when vehicle 100 is in the movable state, and lid 202 is opened, it will be notified to a passenger. Therefore, when vehicle 100 travels in the state where lid 204 is opened, a warning to close lid 204 can be given to a driver.

In the present embodiment, description is given that the collector of transistor 506 is connected to ground node 512, and light-emitting unit 208 is connected to power supply node 220, as shown in FIG. 8. However, a configuration is not limited to the configuration described above.

Figure 15:
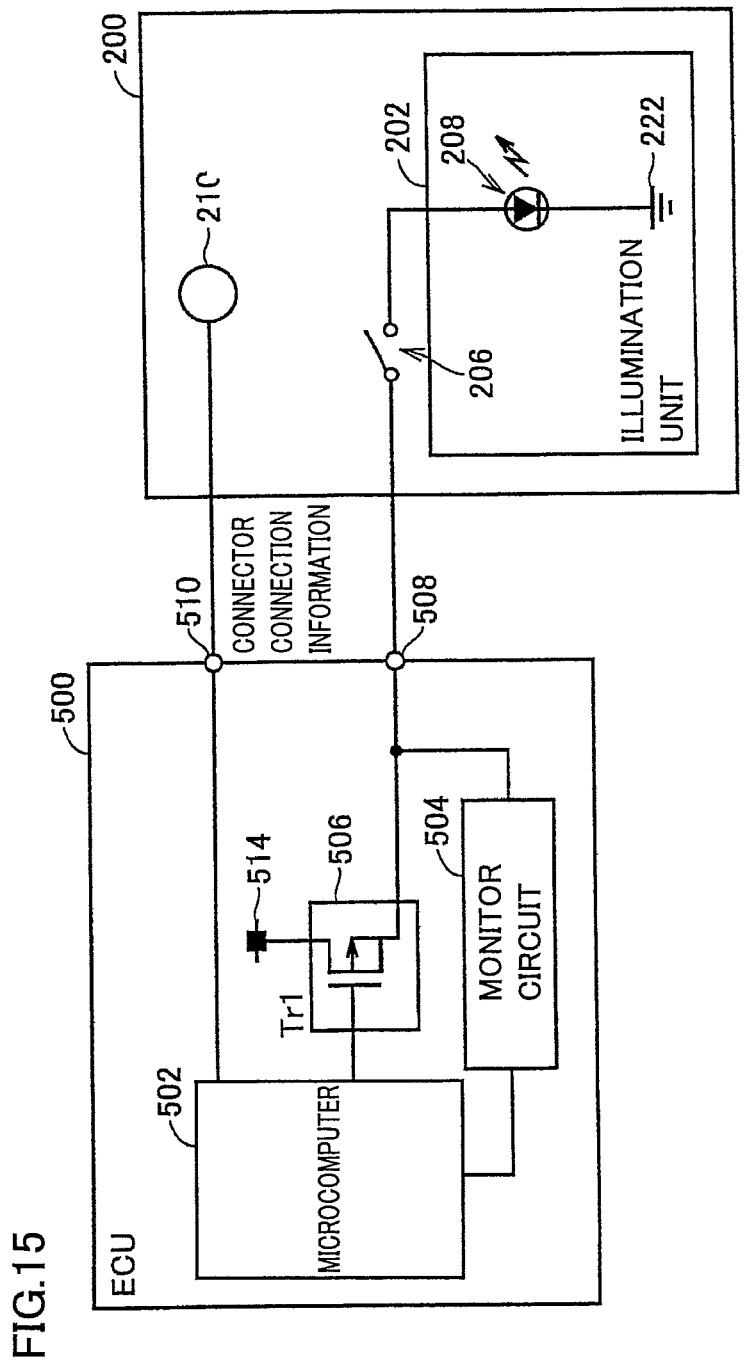
FIG. 15 represents configurations of an ECU and a charging inlet in accordance with another embodiment.

For example, transistor 506, lid switch 206, and illumination unit 202 may be connected in series as shown in FIG. 15. The collector of transistor 506 is connected to power supply node 514 connected to a power supply such as an auxiliary machine battery. Light-emitting unit 208 is connected to ground node 222. Even with such a configuration, a functional effect similar to the configuration shown in FIG. 8 can be achieved. The configuration shown in FIG. 15 is the same as the configuration shown in FIG. 8, except for the configuration described above. Therefore, the detailed description thereof will not be repeated.

Further, microcomputer 502 of ECU 500 may execute the off-control with respect to transistor 506 when charging connector 250 is not connected to power receiving unit 210 before elapse of a predetermined time period after lid 204 is opened. With such a configuration, a long-time illumination state of illumination unit 202 can be suppressed, as the increase of consumed power can be suppressed.

Figure 16:
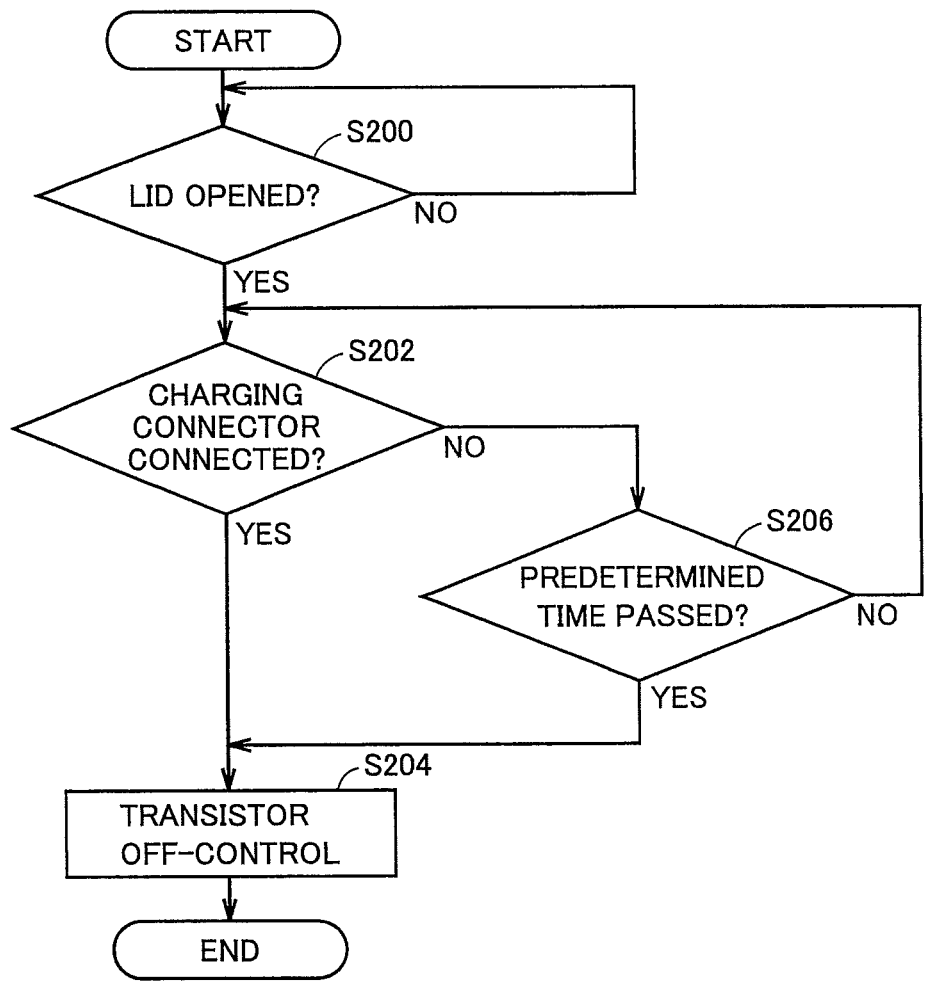
FIG. 16 is a flowchart for describing an operation of turning off the illumination after elapse of a predetermined time period from opening the lid.

With reference to the flowchart shown in FIG. 16, the above-described control executed by microcomputer 502 will be described.

In S200, microcomputer 502 determines whether or not lid 204 is opened. When lid 204 is opened (YES in S200), the process proceeds to S202. If not so (NO in S200), the process returns to S200.

In S202, microcomputer 502 determines whether or not charging connector 250 is connected to power receiving unit 210. When it is determined that charging connector 250 is connected to power receiving unit 210 (YES in S202), the process proceeds to S204. If not so (NO in S202), the process proceeds to S206.

In S204, microcomputer 502 executes the off-control with respect to transistor 506. In S206, microcomputer 502 determines whether or not a predetermined time period has passed after lid 204 is opened. When a predetermined time period has passed after lid 204 is opened (YES in S206), the process proceeds to S204. If not so (NO in S206), the process proceeds to S202.

Microcomputer 502 is operated as follows in accordance with the flowchart shown in FIG. 16. In other words, after lid 204 is opened (YES in S200), when charging connector 250 is not connected to power receiving unit 210 until a predetermined time has passed (NO in S202, YES in S206), microcomputer 502 executes the off-control with respect to transistor 506 (S204).

Further, microcomputer 502 of ECU 500 may execute the off-control with respect to transistor 506 when lid 204 is not closed until a predetermined time period has passed after connection of charging connector 250 with respect to power receiving unit 210 is released. With such a configuration, the long time period illumination state of illumination unit 202 can be suppressed, thus increase in electric power consumption can be suppressed.

Figure 17:
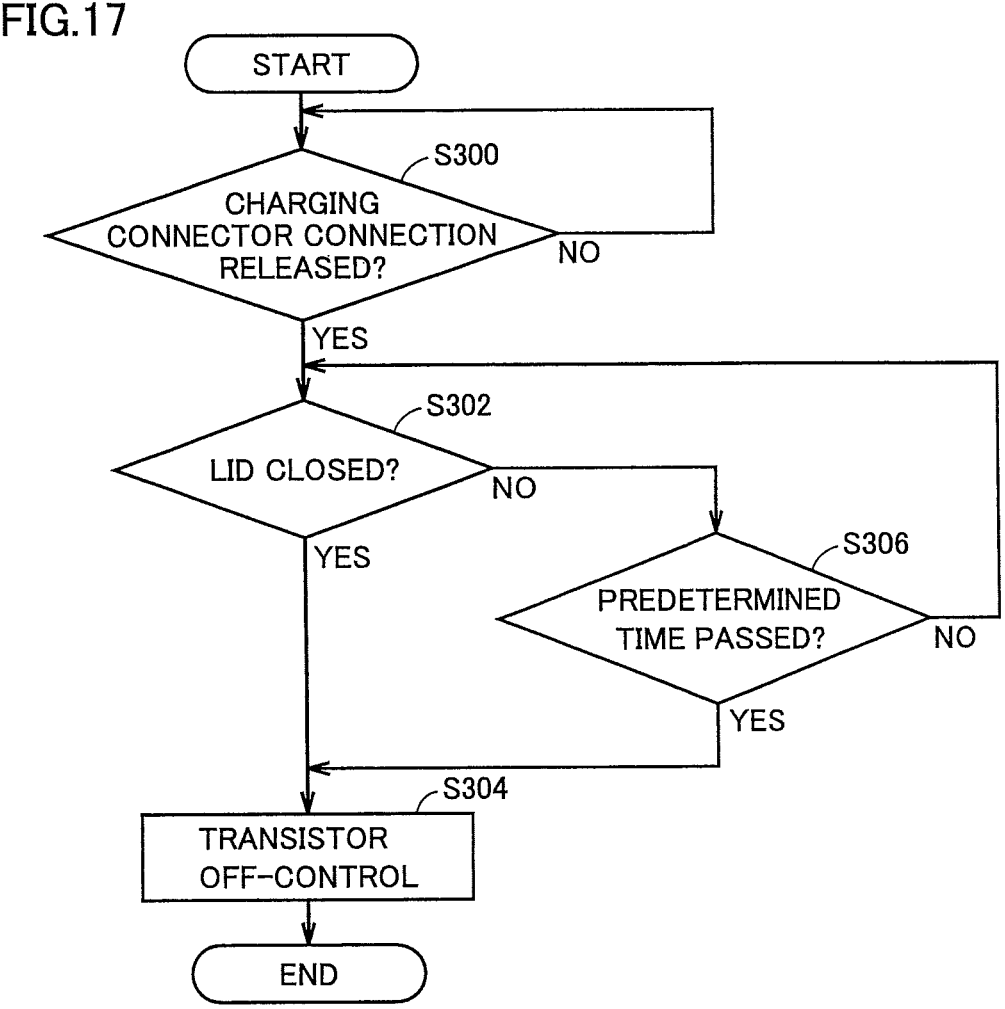
FIG. 17 is a flowchart for describing the operation of turning off the illumination after elapse of a predetermined time period from releasing connection of the charging connector.

Hereinafter, with reference to the flowchart shown in FIG. 17, the above-described control executed by microcomputer 502 will be described.

In S300, microcomputer 502 determines whether or not the connection of charging connector 250 with respect to power receiving unit 210 is released. When the connection of charging connector 250 with respect to power receiving unit 210 is released (YES in S300), the process proceeds to S302. If not so (NO in S300), the process returns to S300.

In S302, microcomputer 502 determines whether or not lid 204 is closed. When lid 204 is closed (YES in S302), the process proceeds to S304. If not so (NO in S302), the process proceeds to S306.

In S304, microcomputer 502 executes the off-control with respect to transistor 506. In S306, microcomputer 502 determines whether or not a predetermined time has passed after the connection of charging connector 250 is released. When a predetermined time has passed after the connection of charging connector 250 is released (YES in S306), the process proceeds to S304. If not so (NO in S306), the process proceeds to S302.

Microcomputer 502 is operated as follows in accordance with the flowchart shown in FIG. 17. In other words, after the connection of charging connector 250 is released (YES in S300), when lid 204 is not closed until a predetermined time has passed (NO in S302, YES in S306), microcomputer 502 executes the off-control with respect to transistor 506 (S304).

In the present embodiment, it is described that vehicle 100 includes power receiving unit 210 with one inlet, power receiving unit 210 may have a plurality of inlets.

Figure 18:
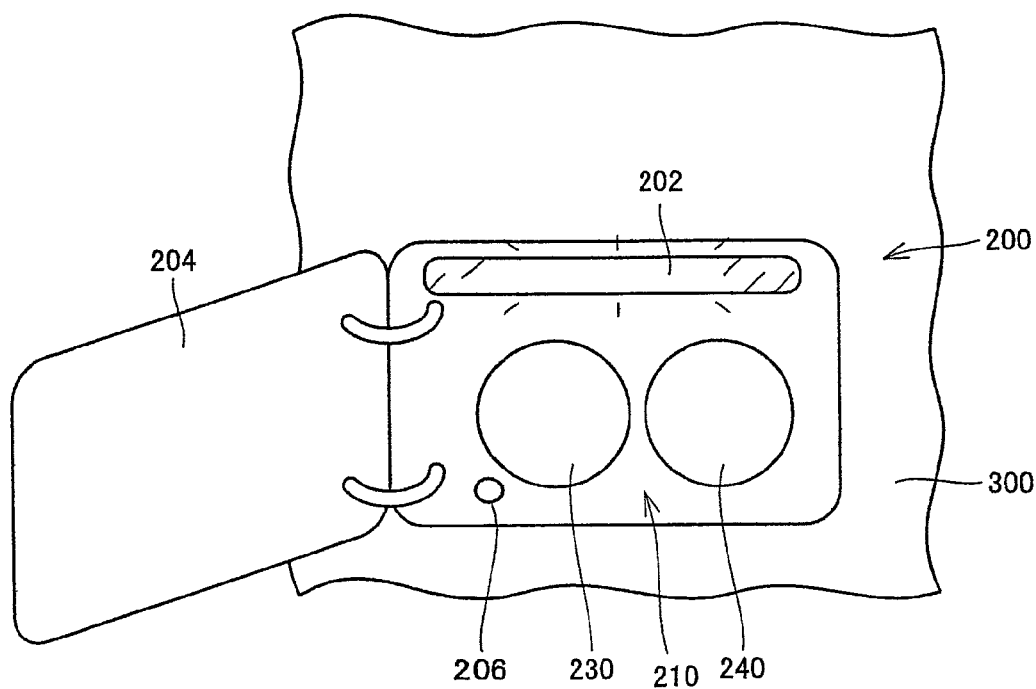
FIG. 18 is a view representing an appearance of a charging inlet having a plurality of inlets.

For example, as shown in FIG. 18, power receiving unit 210 may include a first inlet 230 for connection with a first charging connector connected to an external power supply of alternate current power when charging with use of an external power supply of alternate current power, and a second inlet 240 for connection with a second charging connector connected to external power supply of direct current power supply when charging with use of external power supply of direct current power. The configuration is the same as shown in FIG. 3 except for the configuration of power receiving unit 210 shown in FIG. 18, thus detailed description of the same will not be repeated.

Figure 19:
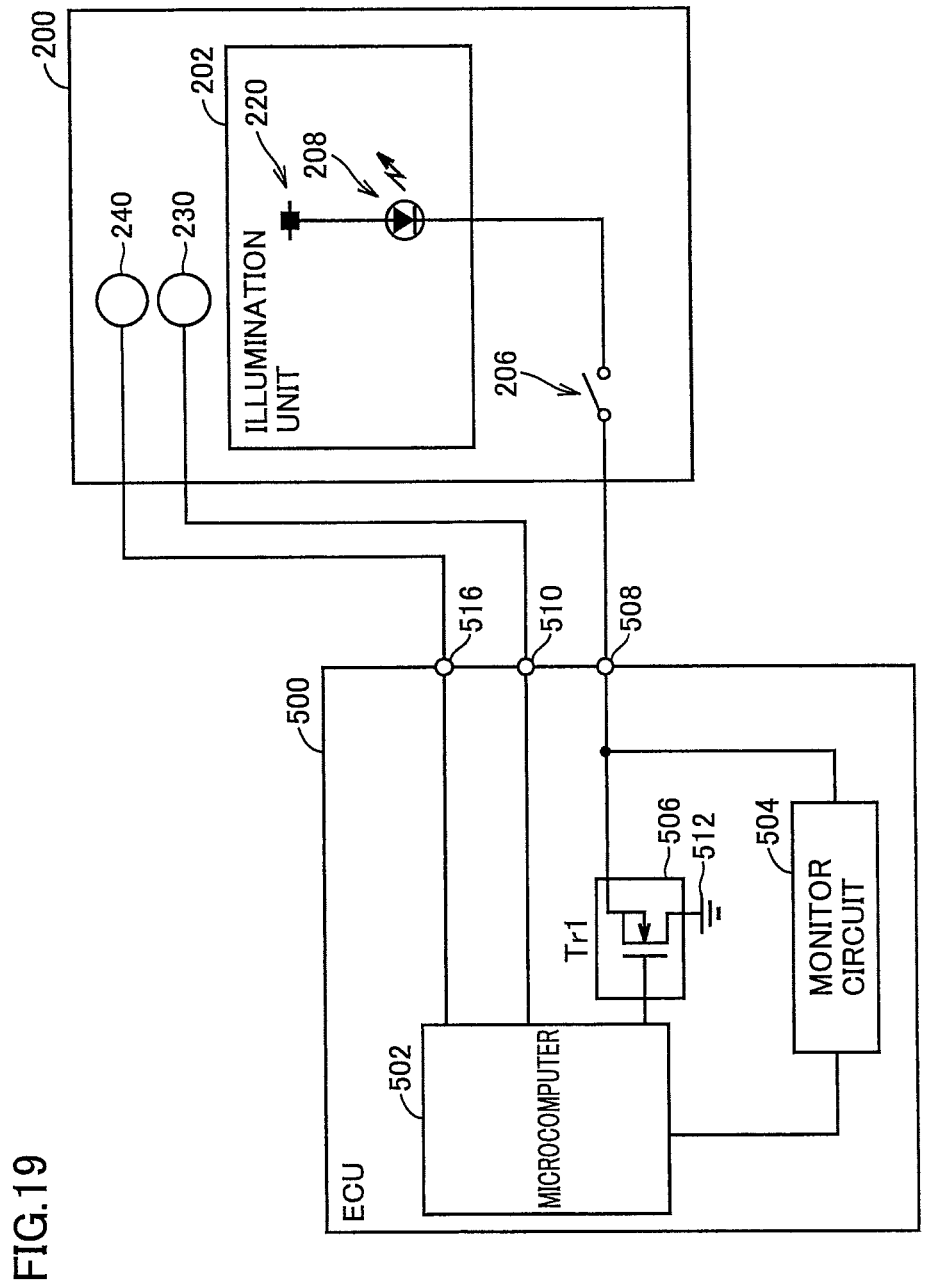
FIG. 19 represents configurations of the ECU and the charging inlet when the plurality of inlets are provided.

Further, in this case, ECU 500 includes microcomputer 502, monitor circuit 504, transistor 506, second ECU terminal 510, first ECU terminal 508, and third ECU terminal 516, as shown in FIG. 19.

Microcomputer 502 receives a signal indicating a detection result of connection state of the first connector with respect to first inlet 230 from first inlet 230 through second ECU terminal 510. Further, microcomputer 502 receives a signal indicating a detection result of the connection state of second connector with respect to second inlet 240 from second inlet 240 through third ECU terminal 516. The other configuration shown in FIG. 19 is the same as the configuration shown in FIG. 3. Therefore, the detailed description will not be repeated.

In the configuration as shown in FIG. 19, microcomputer 502 controls transistor 506 such that transistor 506 is turned off in accordance with the connection of at least any one of the connection between first connector and first inlet 230 and the connection between second connector and second inlet 240.

For example, microcomputer 502 may execute the on-control with respect to transistor 506 when any one of the states is detected including the state of connection between first connector and first inlet 230 and the state of connection between second connector and second inlet 240.

Further, microcomputer 502 controls transistor 506 such that transistor 506 is turned on in accordance with at least any one of connection release including the connection release between the first connector and first inlet 230 and connection release between second connector and second inlet 240.

For example, microcomputer 502 may execute the off-control with respect to transistor 506 when any one of the states is detected including the state where the connection between first connector and first inlet 230 is released and the state where the connection between second connector and second inlet 240 is released.

The method for detecting the connection state between the first connector and first inlet 230 and the method for detecting connection state between the second connector and second inlet 240 are the same as the method for detecting the connection state between charging connector 250 and power receiving unit 210 as described with reference to FIG. 7. Therefore, the detailed description will not be repeated.

With configuration above, functional effect the same as the vehicle according to the present embodiment described with reference to FIG. 8 can be obtained.

The embodiments as have been described here are mere examples in all aspects and should not be interpreted as restrictive. The scope of the present invention is determined by each of the claims, not by the written description, and embraces all modifications within the meaning of, and equivalent to, the terms in the claims.

REFERENCE SIGNS LIST 1 system; 100 vehicle; 200 charging inlet; 202 illumination unit; 204 lid; 206 lid switch; 208 light-emitting unit; 210 power receiving unit; 220, 514 power supply node; 222, 512; ground node; 230, 240 inlet; 250 charging connector; 270 residential house; 272 charging device; 290 communication bus; 300 vehicle body; 310 connector main body; 312 switch; 314 lock release button; 318, 326 protrusion; 320 charging cable; 322 locking part; 324 hook; 328 slot; 330, 332, 402, 404 signal terminal; 334, 408 charging terminal; 336, 338, 340 resistor; 342, 344, 412, 414 signal line; 460 power storage device; 500 ECU; 502 microcomputer; 504 monitor circuit; 506 transistor; 508, 510, 516 ECU terminal; 520 connection state determining unit; 530 transistor controller; 600 indicator; 602 lid state determining unit; 604 vehicle state determining unit; 606 display controller; 610 indicator ECU; 620 display unit.

The invention claimed is:
1. A vehicle, comprising:
a power storage device;
a power receiving unit for receiving electric power for charging said power storage device from an external power supply;
an illumination unit for emitting light to said power receiving unit in response to a first switch attaining a first conduction state, and for stopping the emission of said light in response to said first switch attaining a first non-conduction state;
a controller for controlling said first switch such that said first switch attains the first non-conduction state in response to connection between said external power supply and said power receiving unit and such that said first switch attains the first conduction state in response to release of the connection between said external power supply and said power receiving unit;
a lid for shielding said power receiving unit from outside of said vehicle;
a second switch which attains a second conduction state when said lid is opened, and attains a second non-conduction state when said lid is closed; and
a notifying unit for notifying a passenger of said vehicle about state of said lid, wherein
when said second switch is in said second conduction state and a shift position other than a parking position is selected, said controller causes said notifying unit to notify that said lid is opened,
when said second switch is in said second conduction state and the parking position is selected, said controller does not cause said notifying unit to notify that said lid is opened.

2. The vehicle according to claim 1, wherein said first switching, said second switch, and said illumination unit are connected in series.

3. The vehicle according to claim 1, wherein said vehicle further comprises:
a detector for detecting which of the second conduction state and the second non-conduction state said second switch is in,
wherein
said controller uses said notifying unit to notify the passenger about a state of said lid based on a detection result provided by said detector.

4. The vehicle according to claim 3, wherein said notifying unit is a display unit provided at an indicator, and said controller causes said display unit to display that said lid is opened when said second switch is in said second conduction state.

5. The vehicle according to claim 1, wherein said first switch is a transistor.

6. A method for controlling a vehicle including a power storage device, a power receiving unit for receiving electric power charging said power storage device from an external power supply, an illumination unit emitting light to said power receiving unit in response to a first switch attaining a first conduction state, and for stopping the emission of said light in response to said first switch attaining a first non-conduction state, a lid for shielding said power receiving unit from outside of said vehicle, and a second switch which attains a second conduction state when said lid is opened, and attains a second non-conduction state when said lid is closed, said method comprising the steps of:
controlling said first switch such that said first switch attains the first non-conduction state in response to connection between said external power supply and said power receiving unit, and
controlling said first switch such that said first switch attains the first conduction state in response to release of the connection between said external power supply and said power receiving unit, notifying a passenger of said vehicle about a state of said lid notifying that said lid is opened when said second switch is in said second conduction state and a shift position other than a parking position is selected, and not notifying that said lid in opened when said second switch is in said second conduction state the parking position is selected.

* * * * *